United States Patent [19]
Yokota et al.

[11] Patent Number: 5,552,907
[45] Date of Patent: *Sep. 3, 1996

[54] LIGHT ADJUSTING SHEET HAVING A SINUSOIDAL SURFACE AND A NON-OPTICALLY FLAT SURFACE AND USEABLE WITH AN LCD

[75] Inventors: Tomohiro Yokota, Aichi-ken; Fumio Nishitani, Chita; Hiroshi Ogawara, Shiga-ken; Akihito Kubo; Makoto Fujigami, both of Tsukuba, all of Japan

[73] Assignee: Sekisui Chemical Co., Ltd., Osaka, Japan

[*] Notice: The term of this patent shall not extend beyond the expiration date of Pat. No. 5,394,255.

[21] Appl. No.: 301,412

[22] Filed: Sep. 8, 1994

Related U.S. Application Data

[63] Continuation-in-part of Ser. No. 8,995, Jan. 26, 1993, Pat. No. 5,394,255.

[30]  Foreign Application Priority Data

| Jan. 27, 1992 | [JP] | Japan | 4-11864 |
| May 7, 1992 | [JP] | Japan | 4-114781 |
| Jul. 27, 1992 | [JP] | Japan | 4-199576 |

[51] Int. Cl.$^6$ .............. G02F 1/1335; F21V 7/04
[52] U.S. Cl. ................. 359/49; 359/69; 362/31
[58] Field of Search ............... 362/26, 31, 32; 359/42, 48, 49, 69, 70, 599

[56] References Cited

U.S. PATENT DOCUMENTS

| 5,005,108 | 4/1991 | Pristash et al. | 362/31 |
| 5,394,255 | 2/1995 | Yokota et al. | 359/49 |
| 5,414,599 | 5/1995 | Kaneko et al. | 362/31 |

OTHER PUBLICATIONS

"Backlighting for Liquid Crystal Display", IBM Technical Disclosure Bulletin, vol. 29, No. 11, Apr. 1987, pp. 4838–4839.

*Primary Examiner*—Anita Pellman Gross
*Assistant Examiner*—Walter J. Malinowski
*Attorney, Agent, or Firm*—Townsend & Banta

[57] ABSTRACT

A light adjusting sheet for a planar lighting device includes a plurality of convex and concave streaks arranged alternately and approximately parallel to each other on one surface. The streaks may have a cross section of a sine curve. Another light adjusting sheet consists of a plurality of single sheets each having the above configulation, stacked together. A planar lighting device includes the light adjusting sheet of the above configulation, wherein peak lines of the convex streaks and bottom lines of the concave streaks are arranged to make a predetermined angle with an axis of a linear light source. The liquid crystal display includes a liquid crystal display element placed on front of the planar lighting device of the above configulation.

17 Claims, 11 Drawing Sheets

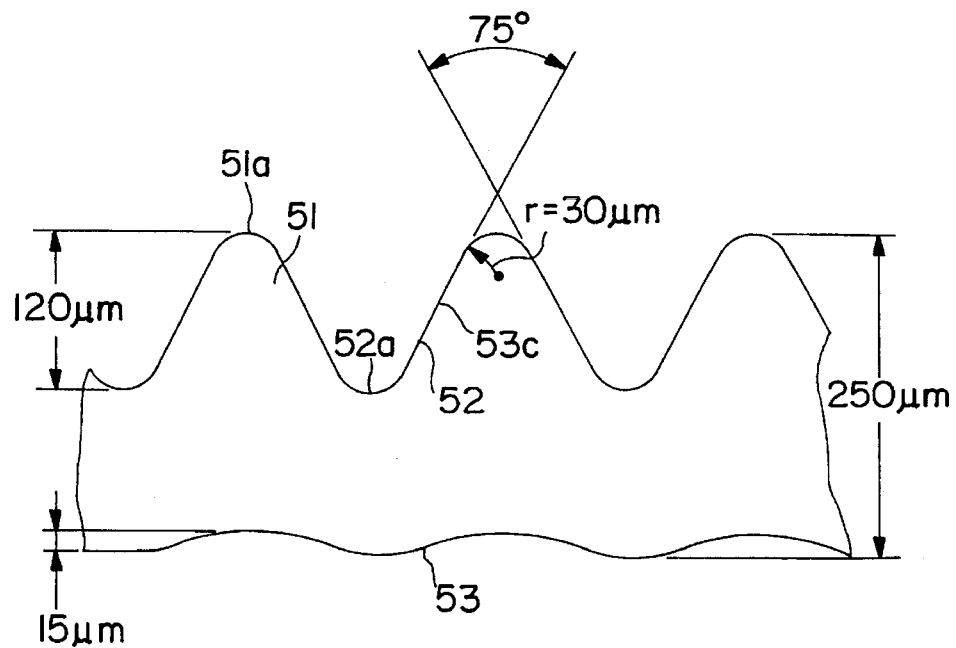
F I G. 16
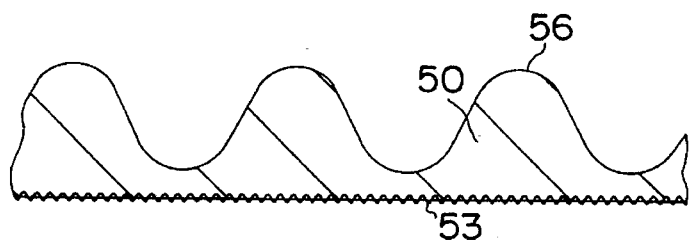
F I G. 17
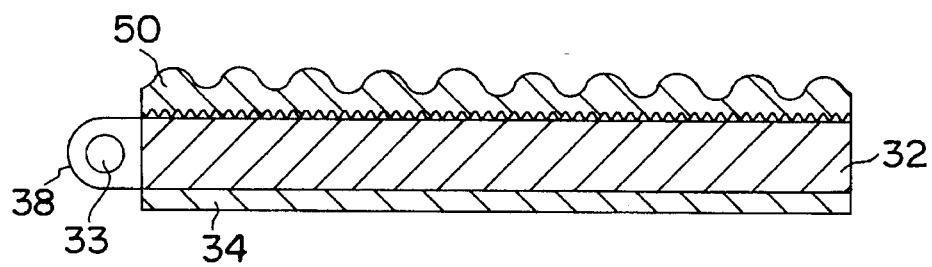
F I G. 18

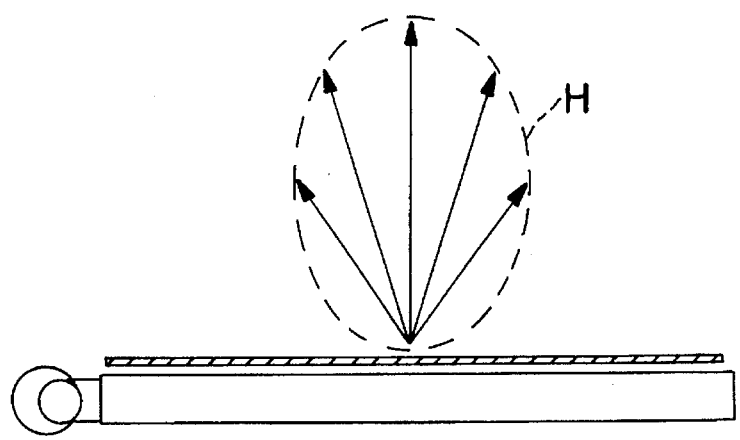
F I G. 19
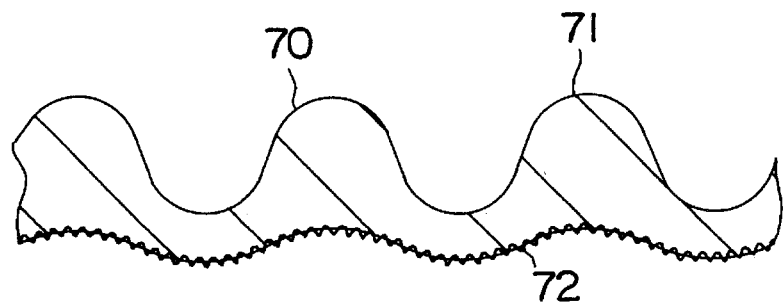
F I G. 20
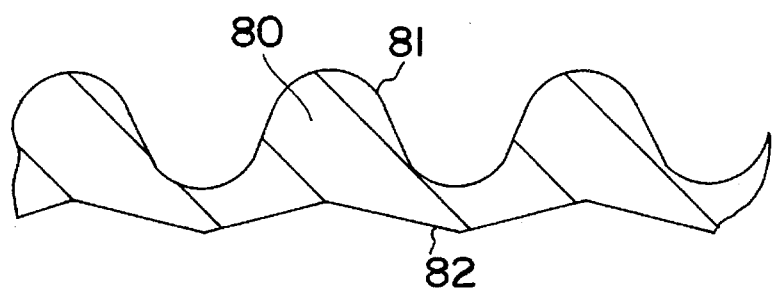
F I G. 21

LIGHT ADJUSTING SHEET HAVING A SINUSOIDAL SURFACE AND A NON-OPTICALLY FLAT SURFACE AND USEABLE WITH AN LCD

RELATED APPLICATION

This application is a continuation-in-part of application Ser. No. 08/008,995 filed Jan. 26, 1993, now U.S. Pat. No. 5,394,255, which claims priority based on Japanese Applications 11864/92 filed Jan. 27, 1992, 114781/92 filed May 7, 1992 and 199576/92 filed Jul. 27, 1992.

FIELD OF THE INVENTION

This invention relates to a light adjusting sheet for a planar lighting device used for a liquid crystal display of personal computers or word processors or a liquid crystal television set, and a planar lighting device and a liquid crystal display using the sheet, and in particular to a light focusing or adjusting sheet for a planar lighting device of the edge-light type suitable for a back light of a thin display and a planar lighting device and a liquid crystal display using the sheet.

BACKGROUND OF THE INVENTION

Smaller, lighter and thinner word processors and personal computers have been developed every year, and those having the so-called laptop type or notebook type size have become today's main trend. Since the liquid crystal display of the laptop type or the notebook type is usually not luminescent by itself, it has a back light on its back surface to improve visibility. The back light is required to be thin and to illuminate the display surface uniformly.

Usually, a planar lighting device is used as the back light, and many kinds of planar lighting devices are used. For example, as shown in FIG. 1, one of them has a light source 11 on the back side of a diffusing plate 10, wherein the light is emitted from the back side of the diffusing plate 10 and emanates uniformly from the surface of the diffusing plate 10 or from a regulator plate 12 attached to the surface of the diffusing plate 10, as described in Japanese Patent Provisional Publication No. 257188/90.

However, the most widely used planar lighting device is that of a so-called edge-light type. The edge-light type planar lighting device has a light source on a side of a light guiding plate, wherein the light emitted from the light source emanates uniformly from the surface of the light guiding plate or from a plate attached to the light guiding plate, and is widely used because it is thin and light, etc.

Recently, along with the efforts to make thinner displays and color displays, there is an increasing demand for improved luminance of a planar lighting device as the back light for displays. Since a user of the display looks at the display from the front side in most of the time, it is necessary to regulate the direction of the emanated light from the planar lighting device so that the light emanates efficiently in the forward direction to improve the luminance using the same light source. However, if the light emanates within a too narrow range, a slight change in the direction of the user's sight will make the display invisible. Therefore, it is required to diffuse the light across an appropriate range.

The details are described here using this planar lighting device of the edge-light type as an example. In general, if a light source is provided on the edge side of a thin light guiding plate, a light which enters the light guiding plate through the edge surface repeatedly experiences total reflections and almost no light leaves the light guiding plate because of the difference in the refractive index between the air and the light guiding plate. In the planar lighting device, an irregular reflection layer is provided on the back surface of the light guiding plate and a reflector plate is further provided on the back side of the light guiding plate, so that the light which reaches the back side of the light guiding plate is irregularly reflected by the irregular reflection layer, and then goes out of the light guiding plate directly or after being reflected by the reflector plate. The irregular reflection layer is often formed by the dot-printing using paint including beads of small diameters.

However, the light emitted from the light source on the edge surface of the light guiding plate usually goes out from the light guiding plate at a very small angle from the surface. That is, the light has a strong directionality, as shown in FIG. 2.

A more detailed explanation of the above problem is given here by referring to FIG. 2. A transparent light guiding plate 20 has an irregular reflection layer (not shown) on its back surface. A reflector plate 21 is provided on the back side of the light guiding plate 20, and a linear light source 22 is provided on the edge side of the light guiding plate 20. The light emitted from the light source 22 travels through the light guiding plate 20 and irregularly reflects at the irregular reflection layer provided on the back surface of the light guiding plate 20. Then, the light either directly goes out of the light guiding plate 20 or reflects at the reflector plate 21 and then goes out of the light guiding plate 28. The light from point A has a strong directionality making a very small angle with the surface of the light guiding plate 20, indicated by B in FIG. 2.

Since it is rare that the user looks at the screen of the display at such a small angle with the surface of the light guiding plate 28, it is necessary to change the angle of the emanating light. In order to improve the directionality of the light, a method in which a light diffusing plate 23 is provided on the front surface of the light guiding plate 20 has been proposed, as shown in FIG. 3. The light diffusing plate 23 is a transparent plastic sheet applied with a paint containing a white pigment on its surface, or a transparent plastic sheet provided with fine unevenness on its surface by the mat treatment, the crimp treatment, or such. By providing the light diffusing plate 23, the light in the direction perpendicular to the diffusing plate 23 increases, indicated by C in FIG. 3.

FIG. 4 shows a detail of the light crystal display, illustrating the basic structure of the planar lighting device of the edge-light type. The planar lighting device 30 mainly includes a light guiding plate 32 consisting of a transparent plate having a dot pattern 31 on the back surface, at least one linear light source 33 of a cathode ray tube (fluorescent lamp) provided on at least one side of the light guiding plate 32, a reflector plate 34 provided behind the light guiding plate 32, and a light diffusing sheet 35 consisting of a resin plate including a light diffusing material or a resin plate provided with crimps on its surface, and a liquid crystal display element 36 is further provided in front of the planar lighting device 30 (refer to Japanese Patent Provisional Publication No. 244490/89, U.S. Pat. No. 4,775,222 and U.S. Pat. No. 4,729,068). The dot pattern 31 is a light scattering printed dot pattern formed on the back surface of the light guiding plate 32 so that the incident light from the light source 33 on the side goes out uniformly from all parts of the screen of the display, and it may be called a pseudo light source. The light diffusing sheet 35 functions in such a way that the back light source, i.e. the dot pattern 31 as the pseudo light source, is not visible and the screen is seen as a uniformly luminescent plane, when using the liquid crystal display screen.

However, in the device using the light diffusing plate 35, much of the light is emitted in directions not needed for the user and the light in the forward direction is scarce, so that the luminance of the light in the foward direction from which the user sees is low.

Conventionally, in order to make the dot pattern 31 invisible and increase the light diffusion efficiency, the following measures have been taken: i) coating a light diffusing material onto a plastic sheet surface or introducing it into the inside of the sheet, and ii) creating a crimp-like unevenness or a regular unevenness on the plastic sheet.

In the former measure i), the light diffusing sheet 35 consists of a sheet formed by an extruder from a material made of a resin such as polyester, polycarbonate or polymethylmethacrylate, mixed with a light diffusing material such as fine-powder of calcium carbonate, titanium oxide, short glass fiber or silicone resin particles containing polysiloxane bonds (refer to Japanese Patent Provisional Publication No. 140343/78).

In the latter measure ii), the sheet having a crimp-like unevenness or a regular unevenness on its surface is provided on the front side of the light guiding plate 32 or on at least one surface of the light diffusing sheet 35 (refer to Japanese Patent Provisional Publication No. 257188/90). Such a sheet is called "a light adjusting sheet".

In one example of the latter measure ii), a light adjusting sheet 37 consisting of a transparent prism sheet with convex ridges and concave ridges each having a triangular cross section, as shown in FIG. 5, is provided on the front side of the light guiding plate 32 so that the opposite surface with no convex ridges and concave ridges of the light adjusting sheet 37 is in contact with the light guiding plate 32 in a liquid crystal display, as shown in FIG. 6. In such a planar lighting device of the liquid crystal display, the strong directional light is redirected in the direction of the user's sight by the slopes of the triangular cross section of the convex ridges and concave streaks, and the emitting direction of the light is confined to a predetermined range and converged in the direction of the user of a wordprocessor or other such device, i.e. the normal direction of the screen, and emanates from the front surface of the light adjusting sheet 37, thus obtaining a higher luminance in the screen.

However, in the former case i), of the planar lighting device with the light diffusing sheet, if the amount of the light diffusing material contained in the light diffusing sheet 35 is increased to improve the light diffusion, the amount of the emanated light is decreased because of the shielding characteristic of the light diffusing material, resulting in insufficient brightness in the screen, indicated by the dotted line D in FIG. 7.

On the other hand, in the latter case ii), of the planar lighting device with the light adjusting sheet, it utilizes the prism effect of the convex ridges and concave ridges on the surface of the light adjusting sheet, and is superior to the former device in terms of the amount of the emanated light. However, since the directionality of the light is too strong and the incident direction and the outgoing direction of the light are too strictly defined, so that the light emanating direction is deflected in the forward direction within a narrow angle range and the sight angle of the screen tends to be exceedingly narrow, as indicated by E in FIG. 8.

Further, when the light adjusting sheet consisting of a prism sheet of a serrate cross section is placed in such a way that its flat back surface is brought into direct contact with the light guiding plate, interference patterns of Newton ring appear due to slight gaps generated between the back surface of the light adjusting sheet and the light guiding plate. The closer the convex ridges and the concave ridges are provided to the final outgoing surface, the lattice-like partition lines of the liquid crystal display surface and the ridge lines and bottom lines of the prism sheet cause interference (the Moire phenomenon), depending on the pitches of the convex ridges and concave ridges.

Further, the inventor experimented with this planar lighting device and found that there is a problem in that the irregular reflection layer provided on the back surface of the light guiding plate is visible, although it can indeed alter the direction of the light efficiently so that the light emanates in the direction of the user's sight. When a display using the liquid crystal is placed on the planar lighting device with the visible irregular reflection layer, the screen of the display is very hard to see.

Therefore, a light diffusing sheet 35 is required in the planar lighting device when it uses the conventional light adjusting sheet.

SUMMARY OF THE INVENTION

Accordingly, it is an object of this invention to provide a light adjusting sheet for a planar lighting device in which the emanated light distribution can be concentrated in the forward direction of the screen, and no Moire fringes occur.

It is another object of this invention to provide a light adjusting sheet for a planar lighting device which gives greater luminance in the forward direction compared with the case when no light adjusting sheet is used, gives a wider sight angle than the conventional light adjusting sheet, and assures prevention of an optically tight contact with the light guiding plate.

It is a further object of this invention to provide a light adjusting sheet for a planar lighting device which gives a suitable span in the direction of the user's sight and an improved brighter screen.

It is a still further object of this invention to provide a light adjusting sheet for a planar lighting device with reduced reflection at the front surface thereof, with no interference fringes, and also with the irregular reflection layer made invisible.

It is yet another object of this invention to provide a planar lighting device of an edge-light type which can illumimate a screen of a display brightly and uniformly.

It is yet further object of this invention to provide a liquid crystal display in which the screen is bright and easily seen.

According to an aspect of the invention, a light adjusting sheet has one surface provided with a plurality of convex ridges or regions each having a cross section of a convex arc and a plurality of concave ridges or regions each having a cross section of a concave arc alternately arranged approximately parallel to each other, and the other surface which is a non optical-flat surface. Throughout the specification, the term "sheet" includes not only a sheet in the strict sense limited by the thickness but also thinner one which is usually called "film". Also, the term "approximately parallel" means that a peak line of each of the plurality of the convex streaks and a bottom line of each of the plurality of the concave ridges are approximately parallel to each other.

As described above, the light adjusting sheet according to the invention has one surface provided with a plurality of convex ridges each having a cross section of a convex arc and a plurality of concave ridges each having a cross section of a concave arc alternately arranged approximately parallel to each other and the other surface of a non optical-flat surface, so that the planar lighting device using this light adjusting sheet has advantages in that the luminance in the forward direction is improved compared with one without the light adjusting sheet, the dot pattern on the back surface of the light guiding plate is not visible in the least, the light diffusion is adequate, the sight angle range is kept equivalent to that of a liquid crystal display element itself, and the interference (Moire phenomenon) between the lattice-like partition lines of the liquid crystal display surface and peak lines of the convex ridges and bottom lines of the concave ridges of the sheet is prevented.

Therefore, if this light adjusting sheet for a planar lighting device is used in a planar lighting device of the edge-light type or a planar lighting device which has a light source on the back side of a light diffusing plate, then a bright and very easy-to-see screen can be obtained by installing the planar lighting device in a liquid crystal display. The light adjusting sheet for a planar lighting device in the invention can be effectively used not only in a liquid crystal display device but also in stores, houses, offices, etc. as a thin planar light source for thin facility lighting equipments.

The measurement procedure of the outgoing light luminance of the planar lighting device is described below. In FIG. 9, let us assume that the normal angular coordinate of the light emanating surface of the planar lighting device 30 is 0°, and then the luminance of point P on the planar lighting device 30 is measured at several positions within the range from −90° to 30 90° with the line which passes the point P and is parallel to the axis of the light source 33 as the axis, using a luminance meter 40. The maximum luminance value of these measurements is represented as 100% and values at other positions are represented as percentages. The relationship between the measurement positions and the luminance is plotted on a graph.

The solid line F and the dotted line G in FIG. 10 show the luminance distributions of the planar lighting device of the edge-light type with the basic structure shown in FIG. 4. The solid line F in FIG. 10 shows the luminance distribution with a wider sight angle, and the dotted line G in FIG. 10 shows the luminance distribution which has a greater amount of the outgoing light in the direction of the user (the normal direction of the screen).

In this lighting device, it is shown that the amount of emanated light is small in the front direction while the user is at the position just in front of the lighting device (0°). In order to increase the luminance distribution in the forward direction, there have been proposals in which the light adjusting sheet 37 with the prisms shown in FIG. 5 in which convex ridges and concave ridges with a serrate-shaped cross section are formed on one or both sides of the sheet is used, or in which fine unevenness is directly formed on the light emanating side of the light guiding plate or on the reflector plate side. These convex ridges and concave ridges provided on the light adjusting sheet or on the light guiding plate are formed parallel to the light source axis. However, in this case, the angle for the maximum amount of emanated light differs depending on models of the planar lighting device. Therefore, when a light adjusting sheet which has prisms with a specific configuration is used, a certain model of the lighting device produces good emanated light characteristics, while another model of the lighting device produces not as good results.

The plurality of the convex ridges and the concave ridges of the light adjusting sheet function to concentrate the outgoing light from the sheet more in the normal direction of the screen. As shown in FIG. 11, these plural convex and concave ridges are provided on the light emanating surface of the light adjusting sheet, and each peak 51a of the convex ridges 51 has a cross section of a convex arc and each bottom 52a of the concave ridges 52 has a cross section of a concave arc. The angle $\alpha$ between the two slopes of each convex ridges (this angle is defined as an angle made by two tangent lines in the middle of the two slopes in this invention) is in the range of 30° to 150°, and preferably of about 60° to 120°. It is difficult to form the convex and concave ridges if the angle is less than 30°, and the light concentration capability of the sheet may decrease if the angle is greater than 150°. The radius $\beta$ of curvature of these convex arcs and concave arcs in cross sections of the convex and concave ridges is determined by the depth $\gamma$ of the convex and concave ridges, the angle $\alpha$ made by the slopes, the pitch $\delta$, etc., and it is preferably 10 to 100 μm. The convex and concave ridges may have a lateral cross section of a sine curve represented by the equation $Y = a \cdot \sin bX$ (wherein Y=coordinate in the depth-wise direction in μm units; X=coordinate in the direction perpendicular to the ridges in μm units; "a"=factor in μm units; "b"=factor in degree/μm units). Though the parameters may be variable, the preferable range of "a" may be 15 to 1500 and that of "b" may be 0.005 to 1 according to experiments conducted by the inventors. If the convex and concave ridges have a cross section of a sine curve as described above, the light is converged by the ridges into the forward direction, resulting a very easy-to-see light when emanated.

As shown above, the light adjusting sheet in this invention has the plurality of the convex ridges each having a peak of a cross section of a convex arc and the concave ridges each having a bottom of a cross section of a concave arc, so that the sheet has functions of adequate light concentration, light diffusion and light directionality of the emanating light to forward direction. Therefore, the surface provided with the convex and concave ridges in the light adjusting sheet may include flat FIGS. 15 and 16, 53C surfaces which form an area less than 50% of the total area of the curved surfaces. In this case, there is a tendency that the light adjusting sheet has an increased light concentration function.

The thickness of the light adjusting sheet is 50 μm or greater, preferably 90 to 300 μm.

The material of which the light adjusting sheet consists is not limited, as long as it is a transparent organic or inorganic material, that is a transparent material such as glass or transparent synthetic resin formed into a sheet. A synthetic resin sheet is particularly preferable. For the transparent synthetic resin, polycarbonate, polymethyl methacrylate, polyester, cellulose synthetic resins, polystyrene, polyvinylchloride and such are preferable. The light adjusting sheet is preferably made of the same type of resin as the base material of the light diffusing sheet which will be described later.

Preferable methods for fabricating the light adjusting sheet made of the synthetic resin include a method in which a transparent synthetic resin is extruded and goes through an embossing roll to have convex and concave ridges formed on the surface, a method in which a synthetic resin is pressed using a die plate with convex ridges and concave streaks provided on the surface, a method in which a synthetic resin is injected into a die with convex streaks and concave ridges provided on the inner surface, etc.

The back surface, which does not have convex ridges or concave ridges, may be a non optical-flat surface. For the non optical-flat surface, those on which fine and random unevenness, for example, may be formed. The size and depth of the unevenness is not limited as long as there is no optically tight contact of a size recognizable by the naked eye when this surface is brought in contact with a smooth surface. The non optical-flat surface can also be a moderate wave formed surface. One example of the moderate wave formed surface is a surface which has concave ridges and convex streaks having approximately the same period and a half amplitude as those formed on the front surface. For the method of forming the non optical-flat surface, the method in which a pattern on a roll or a die is transferred to the surface at the same time of forming the surface, and the method in which calendering, sand blasting, chemical etching, the mat treatment, pressing, etc. are used to give unevenness to an already formed sheet, are applicable. The particularly preferable examples of the methods of forming the non optical-flat surface are the mat treatment, the sand blasting method, the press method and such.

For example, in the case of the planar lighting device without a light guiding plate as shown in FIG. 1, the back surface of the light adjusting sheet is not to be in contact with anything, so that the light adjusting sheet with a flat back surface can be suitably employed. In the case of the planar lighting device with a light guiding plate as shown in FIG. 4, the light adjusting sheet is used with the light guiding plate in contact with its back surface, and interference fringes of Newton ring may result because of the slight gap between this back surface of the light adjusting sheet, and the light guiding plate if the back surface of the light adjusting sheet is a flat surface. Therefore, in such cases, it is preferable to provide unevenness on the back surface of the light adjusting sheet.

For example, it is preferable to form fine unevenness on the back surface formed by sand blasting and such as shown in FIG. 11, because this will eliminate interference fringes of Newton ring and also the light will be diffused. In addition, the directionality of the light decreases if the back surface of the sheet is provided with convex and concave ridges of a cross section of a continuous curve shown in FIG. 20 or of a triangular cross section shown in FIG. 21. According to the experiments by the inventors, even better results can be obtained by making the period of the uneven ridges on the back surface of the light adjusting sheet the same as the period of the convex and concave ridges of the front surface and making the amplitude less than a half of that of the front surface.

As described above, the back surface of the light adjusting sheet opposite to the surface provided with the convex ridges and concave streaks can be changed in various ways to produce different results. Therefore, a suitable combination with the convex and concave ridges of the front surface should be chosen, depending on the refractive index and the thickness of the light guiding plate, the refractive index of the light adjusting sheet, etc.

Also, the light adjusting sheet may contain a light diffusing material. The light diffusing material gives an ability to diffuse light to the light adjusting sheet. For the light diffusing material, white pigments such as calcium carbonate powder, titanium oxide powder and zinc white, white inorganic powder such as alumina powder, silica powder and white clay, glass beads, glass fiber, synthetic resin powder with a refractive index different from that of the light adjusting sheet, etc., are preferable.

Also, regarding the diffusion material content, there is little effect if the light diffusion material is equal to or less than 0.01 weight units against 100 weight units of the transparent material of glass, synthetic resin or such, of which the light adjusting sheet consists, and then the effect does not increase any more. On the other hand, the light transmission performance rather deteriorates if it is 10 weight units or more. Therefore, the range of 0.01 to 10 weight units is preferable, and 0.1 to 5 weight units is more preferable.

There are several methods for making the light adjusting sheet contain the light diffusing material, that is, i) a method in which the light adjusting sheet is formed by a transparent material which is already mixed with the light diffusing material, ii) a method in which the light adjusting sheet is formed by stacking a plurality of layers of a transparent material layer which mainly consists of the light adjusting sheet and a transparent material which includes a light diffusing material, and iii) a method in which a coating material consisting of a transparent material which includes a light diffusing material is coated on the surface of the light adjusting sheet, etc.

The surface of the sheet on which the convex and concave ridges are provided is used as the front surface through which the light emanates. The light transmitted through the front surface is refracted by the convex and concave ridges and converged in the normal direction, i.e. the front direction, of the light adjusting sheet. For example, when the sheet is used in a planar lighting device of the edge-light type, the opposite surface which is not provided with the convex and concave streaks is in contact with the front surface of the light guiding plate. Thus, the light emanated from the front surface of the light guiding plate at a low angle goes through the light adjusting sheet can emanate as a converged light in the forward direction.

More detailed explanations are given below, by referring to an example of the light adjusting sheet of this invention installed in a planar lighting device of the edge-light type. In the planar lighting device of the edge-light type, a light emitted from a linear light source provided on the edge side of the light guiding plate enters the light guiding plate through the edge surface. The light which has entered the light guiding plate is irregularly reflected by the irregular reflection layer and either directly goes out from the front surface or goes out of the front surface after being reflected by the reflector plate provided on the back surface of the light guiding plate. The light emanating from the light guiding plate is very directional, as shown in FIG. 2. Since the light adjusting sheet is provided on the front surface of the light guiding plate, the light enters the light adjusting sheet.

Here, if the opposite surface of the light adjusting sheet which is to be in contact with the light guiding plate has fine unevenness, the opposite surface is not in tight contact with the light guiding plate, and therefore interference fringes of the Newton ring which result from fine gaps at a tight contact do not appear. Further, the light taking-in efficiency (a ratio of the light entered the light adjusting sheet without reflection to the light which goes out of the light guiding plate) is improved.

Then, the light travels through the light adjusting sheet emanates from the front surface having the convex and concave ridges. Here, the light is converged in the forward direction by the convex and concave ridges, and the irregular reflection layer such as dot printing provided on the back surface of the light guiding plate becomes invisible, and thus the light emanates as an easy-to-see light for the user. If a diffusing material is mixed in the light adjusting sheet, the light is suitably diffused.

When a liquid crystal display element is installed in front of the light adjusting sheet, an optical contact of the light adjusting sheet and the liquid crystal display element may not occur by the uneven ridges provided on the surface of the light adjusting sheet.

The light adjusting sheet configured as described thus far is used for a planar lighting device. As shown in FIG. 12, the planar lighting device 30 includes at least one light adjusting sheet 50 with the configuration described above, a light guiding plate 32 provided behind the light adjusting sheet 50 with a printed dot pattern 31 on the back surface, at least one linear light source 33 provided on at least one side of the light guiding plate 32, and a reflector plate 34 provided behind the light guiding plate 32. As shown in FIG. 4, at least one light diffusing sheet 35 may be provided as necessary between the light adjusting sheet 50 and the light guiding plate 32 or in front of the light adjusting sheet 50, i.e. the light emanating end. Then, a liquid crystal display is obtained by installing a liquid crystal display element 36 in front of the planar lighting device 30.

In the planar lighting device, each of the convex and concave ridges of the light adjusting sheet 50 makes a predetermined angle with an axis of the light source 33. In order to provide the convex and concave ridges to make a predetermined angle with the axis of the light source 33, a square sheet provided with a plurality of convex ridges and concave ridges which are parallel to each other and which make a predetermined angle with an edge line of the sheet may be used as a light adjusting sheet, wherein the sheet is arranged so that the edge line of the sheet is parallel to the axis of the light source 33.

As shown in FIG. 13, the plurality of the convex and concave ridges are formed on one side of the sheet in such a way that each peak line 54 of the ridges makes an angle $\theta$ with the edge 55 of the sheet. The angle $\theta$ is preferably in the range of $5°\leq\theta\leq85°$. If $\theta$ exceeds 85°, it may not be possible to obtain a sufficient light concentration effect. If $\theta$ is smaller than 5° or $\theta$ is 5° or greater, the peak lines of the ridges on the light adjusting sheet and the pitch lines between dots of the liquid crystal display may cause Moire fringes.

Additionally, Moire fringes may appear between specific patterns displayed on the liquid crystal display element and the ridges of the light adjusting sheet, though the angle $\theta$ is in the range of $5°\leq\theta\leq85°$. In order to effectively prevent this problem, the angle $\theta$ is preferably approximately 36°, determining by frequency of occurence of the patterns displayed on the liquid crystal display element. If it is not required to consider occurence of Moire fringes with the patterns displayed on the liquid crystal display element, the angle $\theta$ is set by determining the luminance distribution as a function of the measurement direction with the procedure described above, and determining the value at which the emanated light distribution is concentrated towards the front of the screen.

According to another aspect of the invention, a light adjusting sheet for a planar lighting device includes a plurality of sheets, each sheet being provided with a plurality of convex streaks and concave ridges parallel to each other, stacked together in such a way that peak lines of the streaks make an angle of 5° or greater.

The representative example of the light adjusting sheet consists of two square sheets, each square sheet being provided with a plurality of convex ridges and concave ridges approximately parallel to each other, stacked together in such a way that peak lines of the ridges of one square sheet and the other make an angle 5° or greater, the peak lines of the ridges of one square sheet make an angle of 5° to 85° in the clockwise direction with the sheet edge, and the peak lines of the ridges of the other square sheet make an angle of 5° to 85° in the counterclockwise direction with the sheet edges.

In the light adjusting sheet of the two sheet structure, as shown in FIG. 14, supposing the angle between the peak lines of the ridges of one square sheet and the sheet edge be $\theta$ in the counterclockwise direction, then the angle $\theta'$ in the clockwise direction for the other square sheet is preferably in the range of $5°\leq\theta\leq85°$. Also, the angle $\theta$ for one square sheet and the angle $\theta''$ for the other square sheet are preferably set in opposite directions, clockwise and counterclockwise, against the sheet edge, with the same absolute value. However, as discussed above, the angle between the peak lines of the ridges of one square sheet and the peak lines of the ridges of the other square sheet must be 5° or greater, so that these square sheets must be stacked in such a way that the absolute value of the difference between the angles $\theta$ and $\theta''$ is not smaller than 5°. If $|\theta-\theta'|<5°$, then Moire fringes may result from the convex ridges and concave ridges of these square sheets.

When three or more square sheets are stacked together, the sheet stacking is also conducted in such a way that the peak lines of the ridges of one square sheet make an angle of 5° or greater with the peak lines of the ridges of any other square sheet.

Next, each element which composes the planar lighting device 30 will be described.

First, the light adjusting sheet 37 (50, 60) has the configuration described above. It is possible to use a plurality of the light adjusting sheets stacked together, or to use it jointly with a light diffusing sheet 35 of the conventional type.

For the linear light source 33, a cathode ray tube is usually used. The cathode ray tube may be either a cold cathode ray tube or a hot cathode ray tube. There is no limitation on the size and such of the cathode ray tube. The light source(s) is provided on both left and right sides or on one side of the light guiding plate 32. Also, the light sources may be provided on three or all four sides of the light guiding plate 32.

The light guiding plate 32 is made of a material with good transparency such as glass, polycarbonate, polyester and polymethylmethyacrylate, and a printed dot pattern 31 is applied on its back surface, i.e. the surface on the reflector plate side, to cause irregular reflection in such a way that the light from the light source 33 emanates uniformly from each position of the light emanating surface. The thickness and such of the light guiding plate 32 are not limited.

For the reflector plate 34, any plate can be used without limitation as long as it functions to block and reflect a light, such as a resin plate with a white pigment blended into it, a foamed resin plate, a resin plate with a metal vapor coating or a metal plate. The reflector plate 34 is placed on the non-emanating side of the light guiding plate 32, and is in contact with the printed dot pattern 31 of the light guiding plate 32.

The light diffusing sheet 35 diffuses the light so that the user does not see the configuration of the printed dot pattern 31 on the light guiding plate 32. There are several types, that are, a type in which a light diffusing material is mixed, a type in which a light diffusing material is coated, a type in which a random unevenness is formed, and a combination type of the above types. The thickness of this sheet is not limited but is usually 10 µm or greater, and preferably 20 to 300 µm. If the thickness is less than 10 µm, sufficient diffusion characteristics may not be obtained.

BRIEF DESCRIPTION OF THE DRAWINGS

This invention will be explained in more detail in conjunction with appended drawings, wherein:

FIG. 16 is a cross-sectional view showing a light adjusting sheet according to the invention.

FIG. 17 is a cross-sectional view showing a light adjusting sheet according to the invention.

FIG. 18 is a cross-sectional view showing a planar lighting device of the edge-light type using the light adjusting sheet shown in FIG. 17.

FIG. 19 is an explanatory view showing the light distribution characteristics of the planar lighting device of the edge-light type according to the invention.

FIG. 20 is a cross-sectional view showing a light adjusting sheet according to the invention.

FIG. 21 is a cross-sectional view showing a light adjusting sheet according to the invention.

DESCRIPTION OF THE PREFERRED EMBODIMENT

The preferred embodiments according to the invention will be described.

(Embodiment 1)

Figure 15:
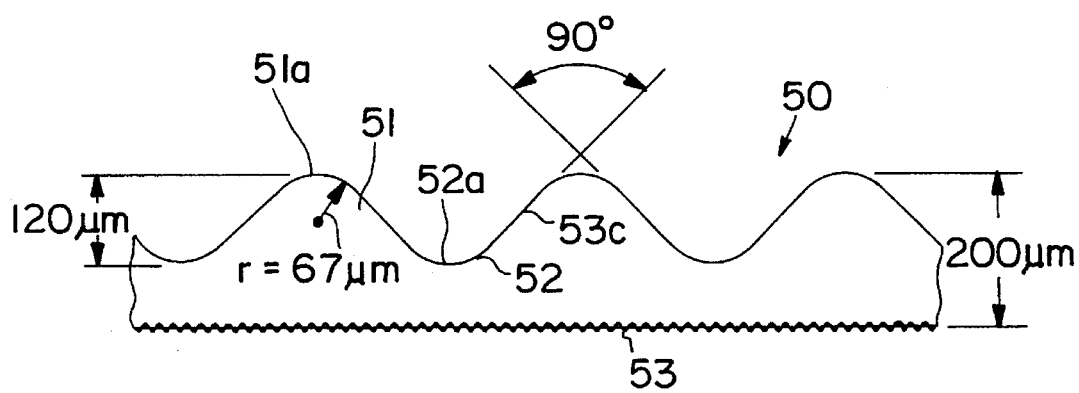
FIG. 15 is a cross-sectional view showing a light adjusting sheet according to the invention.

As shown in FIG. 15, a plurality of convex ridges 51 and concave ridges 52 are alternately formed parallel to each other on the light emanating surface of a square sheet made of polycarbonate with a melt index of 4.0 (290° C., 1.9 kg). A peak 51a of each convex ridges 51 has a lateral cross section of a convex arc, and a bottom 52a of each concave ridges 52 has a lateral cross section of a concave arc. An angle between the two slopes of each convex ridges 52 (an angle between two tangent lines at the middle of each slope) is roughly a right angle. The total thickness of the sheet is 200 µm, the height from the bottom 52a of the concave ridges 52 to the peak 51a of the convex ridges 51 is 120 µm, the pitch of the convex ridges 51 and the pitch of the concave ridges 52 are both 350 µm. The radius of curvature for both the peak 51a of each convex 51 and the bottom 52a of each concave ridges 52 is 67 µm. The convex ridges 51 and the concave ridges 52 are formed by the thermal press method. The back surface 53 of the sheet is provided with fine unevenness by the mat roll method. Such is the configuration of the light adjusting sheet 50 which has a plurality of the convex ridges 51 and the concave ridges 52 on the front surface and the unevenness on the back surface 53 (a light adjusting sheet (a)).

(Performance test)

The forward luminance and the luminance ratio are measured and the appearance is observed for the planar lighting device equipped with the light adjusting sheet described above.

I) Luminance

The cathode ray tube (light source) 32, the light guiding plate 32, the reflector plate 34, and the light diffusing sheet 35, described below, are used to compose the planar lighting device for the measurements of the screen brightness.

Cathode ray tube: Cold cathode ray tubes of 3.0 mm diameter and 130 mm length.

Light guiding plate: 130 mm long, 260 mm wide, 3.0 mm thick. The material is an acrylic resin. Dot printing for irregular reflection is applied on the back surface.

Reflector plate: 100 µm thick. The material is polycarbonate mixed with 20 wt % white pigment (titanium oxide).

Light diffusing sheet: The material is polycarbonate mixed with 10 wt % calciumcarbonate.

Figure 12:
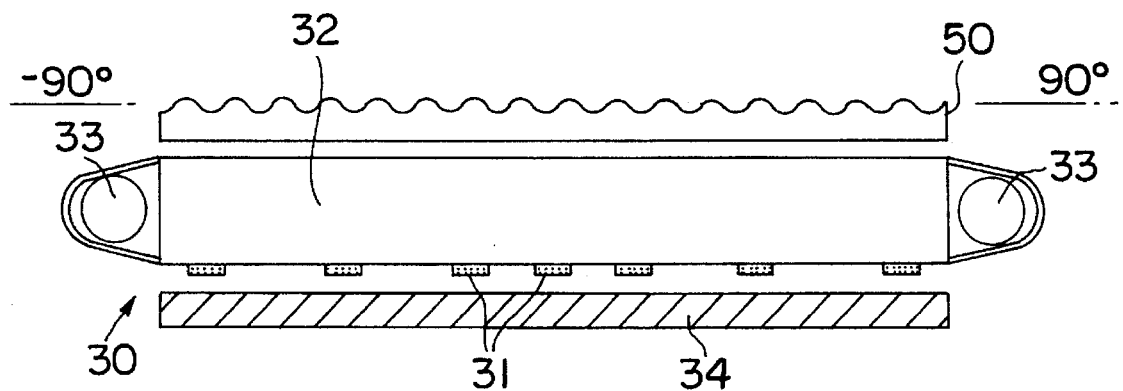
FIG. 12 is a cross-sectional view showing a planar lighting device of the edge-light type according to the invention.
Figure 13:
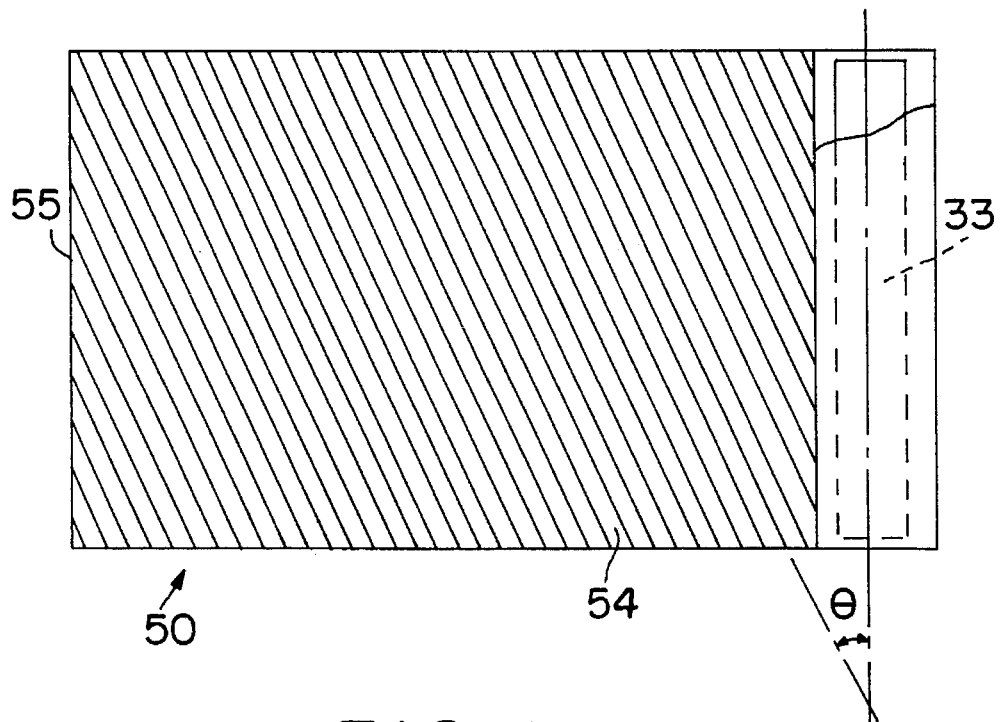
FIG. 13 is a plan view showing a planar lighting device of the edge-light type according to the invention.
Figure 14:
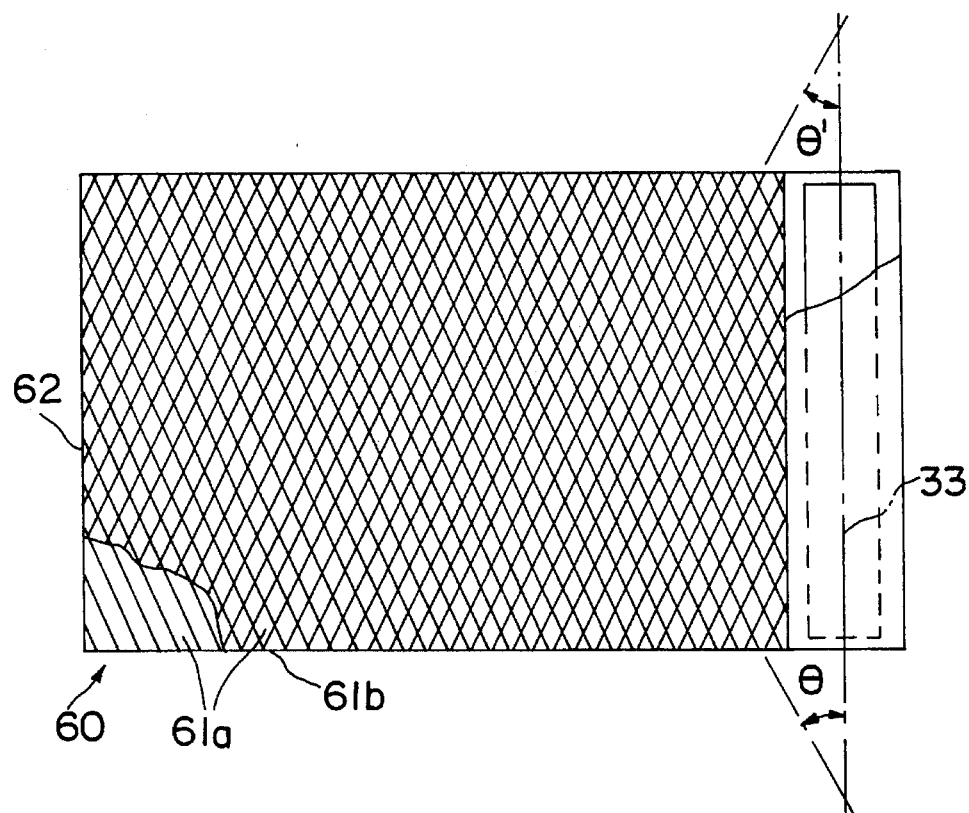
FIG. 14 is a plan view showing a planar lighting device of the edge-light type according to the invention.

In FIG. 12, which shows the basic structure of the planar lighting device of the edge-light type, the cathode ray tube 33 as a light source is placed on each side of the light guiding plate 32 which has the printed dot pattern 31 on its back surface. The reflector plate 34 is placed behind the light guiding plate 32, and the light adjusting sheet 50 is placed in front of the light guiding plate 32. The light adjusting sheet 50 is placed in such a way that the surface with the convex ridges 51 and the concave ridges 52 is to be the light emanating surface and that the convex ridges 51 and the concave ridges 52 are parallel with the axis of the cathode ray tubes 33.

With the planar lighting device 30 described above, the luminance is measured in the normal direction (0°) and in the direction of 30° from the normal direction. The procedure to measure the luminance is as described before.

II) Appearance

For the planar lighting device 30 described above, the screen is checked to see if there is any problem in appearance.

(Embodiments 2 to 4)

Light adjusting sheets (b), (c) and (d) are obtained by the same procedure as for the sheet (a), except that the sheet material, the size of the convex ridges and concave ridges and the forming method of unevenness of the back surface are changed to the items listed in Table 1. For the planar lighting devices equipped with either light adjusting sheet of (b), (c) or (d), a performance test is conducted in the same manner as for Embodiment 1. The light adjusting sheet (d) of Embodiment 4, as shown in FIG. 16, has a back surface of non optical-flat surface 53 formed into a moderate wave form surface by the press method.

(Control Example 1)

A performance test is conducted in the same manner as for Embodiment 1 for a planar lighting device which is not equipped with the light adjusting sheet of this invention.

(Control Examples 2 to 3)

Figure 5:
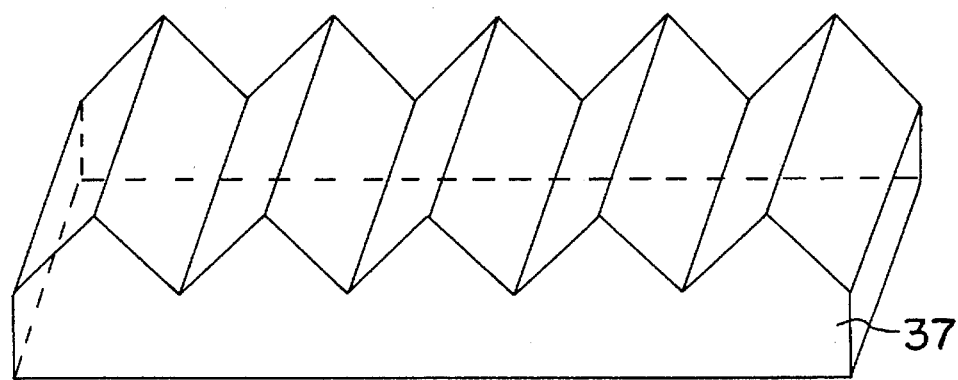
FIG. 5 is a perspective view showing the conventional light adjusting sheet for a planar lighting device.
Figure 6:
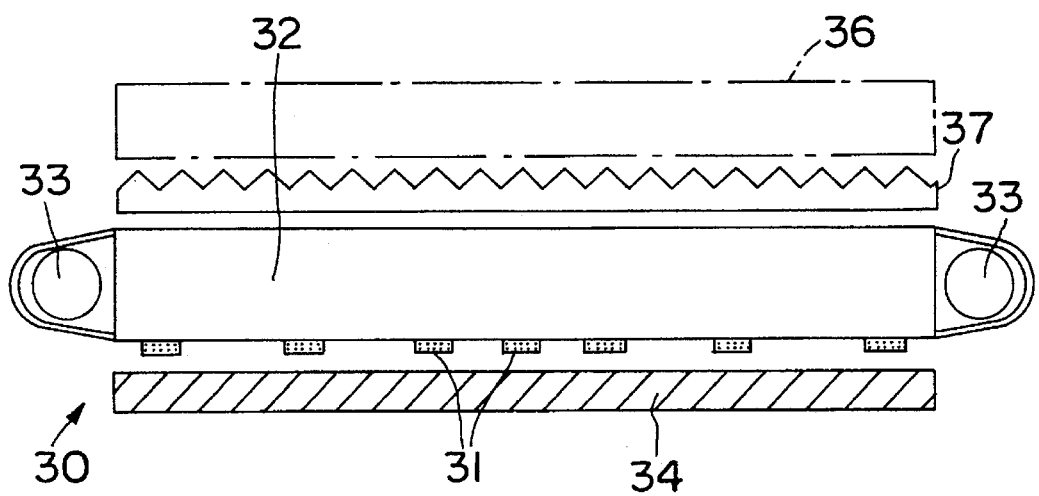
FIG. 6 is a cross-sectional view showing the conventional liquid crystal display device of the edge-light type.
Figure 7:
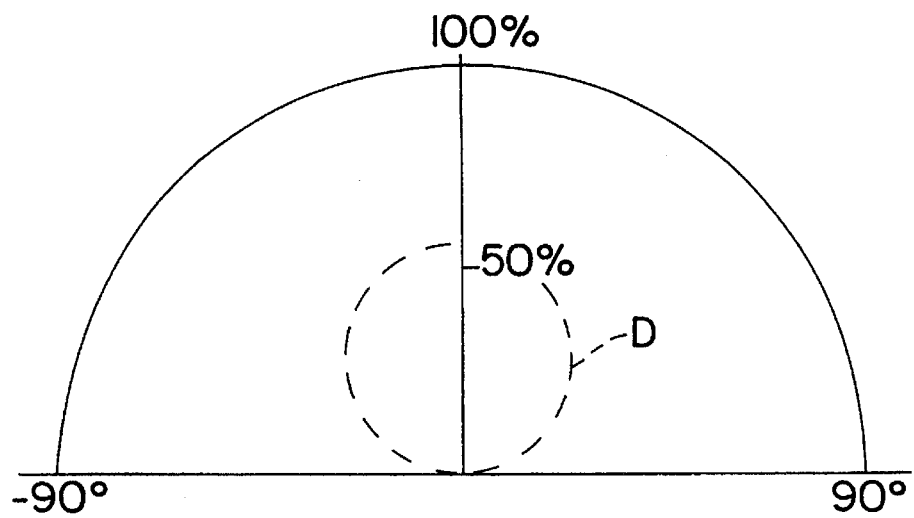
FIG. 7 is a luminance distribution diagram for the planar lighting device of the edge-light type.
Figure 8:
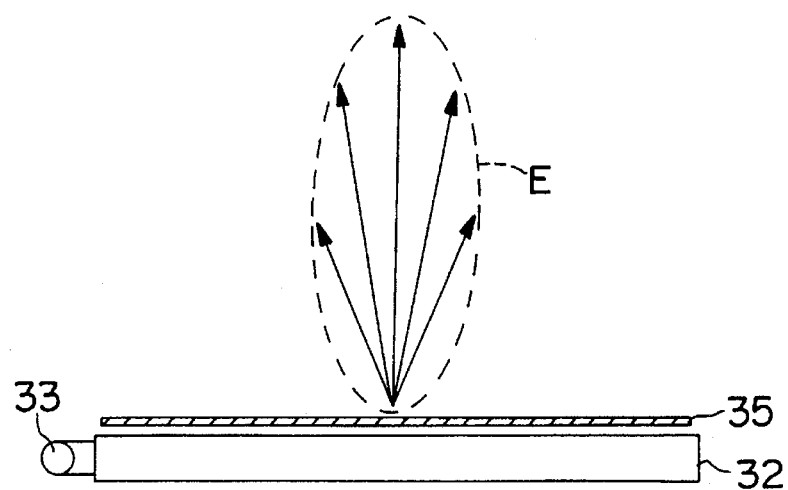
FIG. 8 is a luminance distribution diagram for the planar lighting device of the edge-light type.
Figure 9:
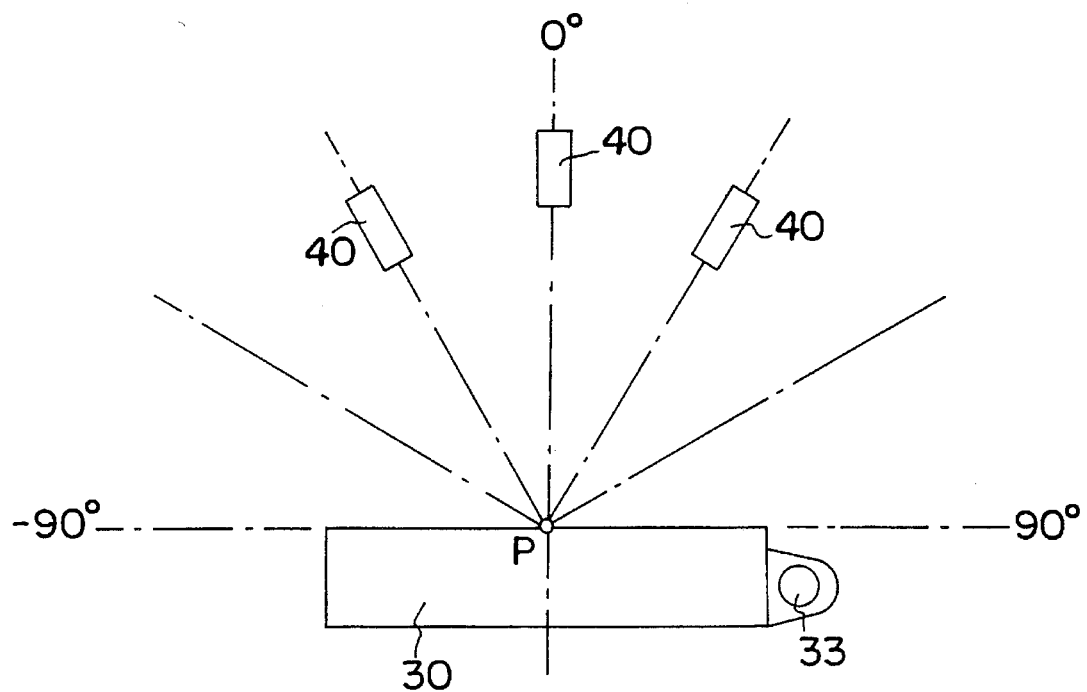
FIG. 9 is a schematic diagram showing the luminance measurement procedure for the planar lighting device.
Figure 10:
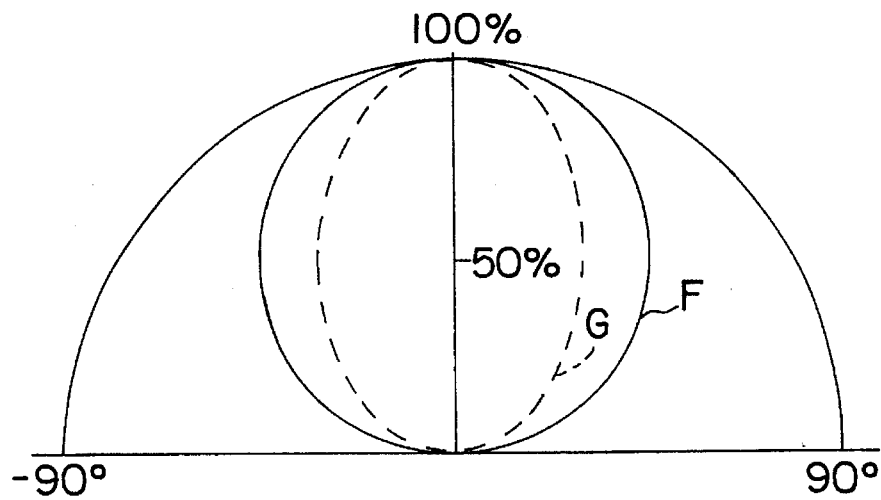
FIG. 10 is a luminance distribution diagram for the planar lighting device of the edge-light type.
Figure 11:
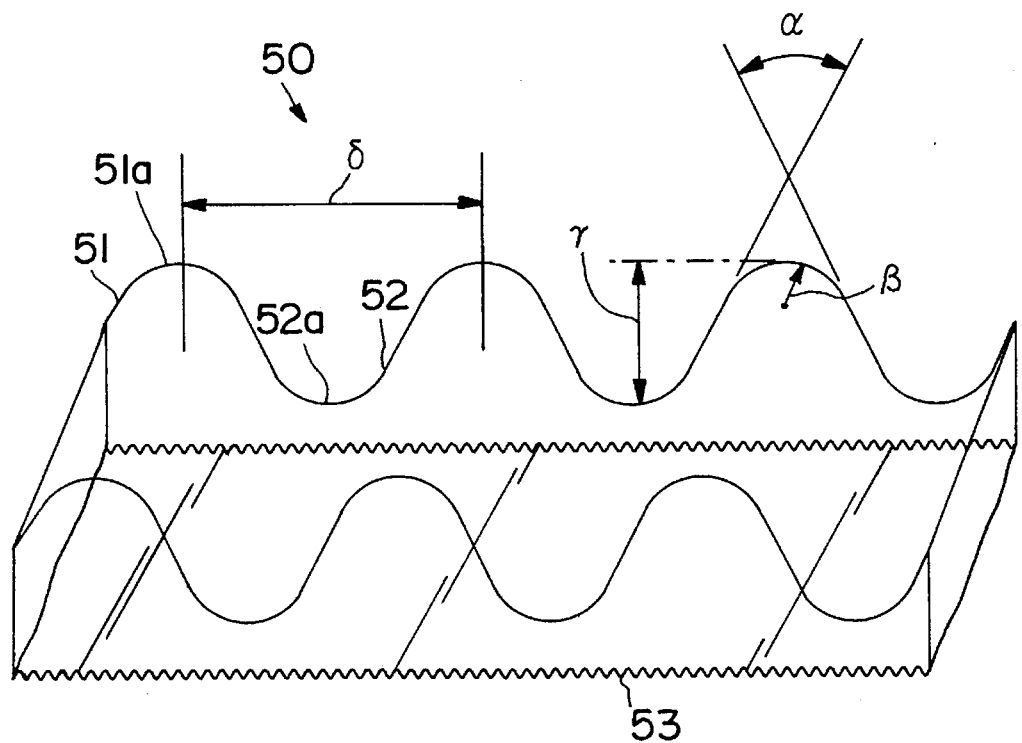
FIG. 11 is a perspective view showing a light adjusting sheet according to the invention.

The light adjusting sheets (e) and (f) are obtained by the same procedure as for the sheet (a), except that the sheet material, the size of the convex ridges and the concave ridges and the forming method of the unevenness of the back surface are changed to the items listed in Table 1. A performance test is conducted in the same manner as for Embodiment 1 for the planar lighting devices equipped with each of the light adjusting sheets (e) or (f). The light adjusting sheet (e) corresponds to the conventional sheet shown in FIG. 5.

The sheet material, the size of the convex ridges, the forming method of the back surface, and the results of the performance tests for each light adjusting sheet of the Embodiments and the Control examples are summarized in Table 1. In Table 1, the marks represent as following:

*: A light diffusing sheet which has a random uneven surface on the front surface and a mat surface on the back surface.

○: No problem

×: There is some problem

As clearly shown in Table 1, compared with those of the Controle examples, the light adjusting sheets of the Embodiments have superior luminance in the normal direction (0°) and in the direction of 30° from the normal direction, and they are superior in appearance as well.

TABLE 1

|  | Examples | | | | Control examples | | |
| --- | --- | --- | --- | --- | --- | --- | --- |
|  | 1 | 2 | 3 | 4 | 1 | 2 | 3 |
| Light adjusting sheet | a | b | c | d | none | e | f* |
| Material | poly-carbonate | poly-carbonate | polymethyl methacrylate | poly-carbonate | — | polymethyl methacrylate | poly-carbonate |
| Total thickness (μm) | 200 | 170 | 400 | 250 | — | 500 | 250 |
| Concave depth (μm) | 120 | 70 | 180 | 120 | — | 180 | — |
| Peak angle (°) | 90 | 80 | 100 | 75 | — | 90 | — |
| Pitch (μm) | 350 | 190 | 430 | 200 | — | 360 | — |
| Radius of curvature of convex and concave ridges (μm) | 67 | 50 | 30 | 30 | — | 0 | — |
| Forming method of back surface | Mat roll | Sand blast | Random uneven die press | sine curve with the phase as light | — | Mirror surface | — |
| Luminance (0°, cd/m²) | 405 | 400 | 415 | 420 | 150 | 530 | 330 |
| Luminance (30°, cd/m²) | 380 | 385 | 375 | 370 | 250 | 45 | 360 |
| Appearance | ○ | ○ | ○ | ○ | × Dots are visible. | × Dots are visible. Bright points by a tight contact. | ○ |

(Embodiment 5)

FIG. 17 shows a part of a light adjusting sheet for a planar lighting device in Embodiment 5, and FIG. 18 shows a planar lighting device of the edge-light type in which the light adjusting sheet shown in FIG. 17 is used.

In FIG. 17, the light adjusting sheet 50 has a front surface 56 provided with convex ridges and concave ridges forming a sine curved surface and a back surface 53 of unevenness.

In FIG. 18, the numeral 32 represents a light guiding plate consisting of a polymethylmethacrylic plate with a 3 mm thickness, and a dot-printed irregular reflection layer (not shown) is provided on the back surface of the light guiding plate 32. The particle diameter of the beads used in the dot printing is in the range of 0.5 to 1.5 mm. the numeral 34 represents a reflector plate. The reflector plate 34 is provided on the back surface of the light guiding plate 32. The reflector plate 34 reflects the light emanating from the back surface of the light guiding plate 32 back to the light guiding plate 32. The numeral 50 represents a light adjusting sheet consisting of a polycarbonate transparent sheet. The light adjusting sheet 50 is made by the method in which polycarbonate is formed into a 200 μm thick sheet with convex ridges and concave ridges having an amplitude of 120 μm and a pitch of 350 μm on the front surface 56 by the press process, and providing fine unevenness on the back surface 53 by the sand blasting method. The light adjusting sheet 50 is used such that the back surface 53 which has fine unevenness is in contact with the light guiding plate 32. The numeral 33 represents a linear light source provided on the edge side of the light guiding plate 32. The numeral 38 represents a reflector cover. The reflector cover 38 is installed behind the light source 33 and helps the light emitted from the light source 33 efficiently enter the light guiding plate 32.

Figure 2:
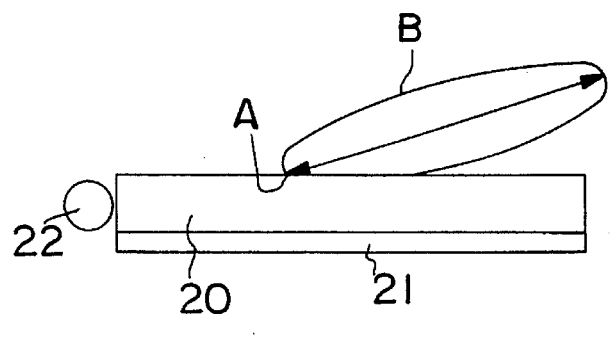
FIG. 2 is an explanatory view showing the light distribution characteristics of the conventional planar lighting device of the edge-light type.
Figure 3:
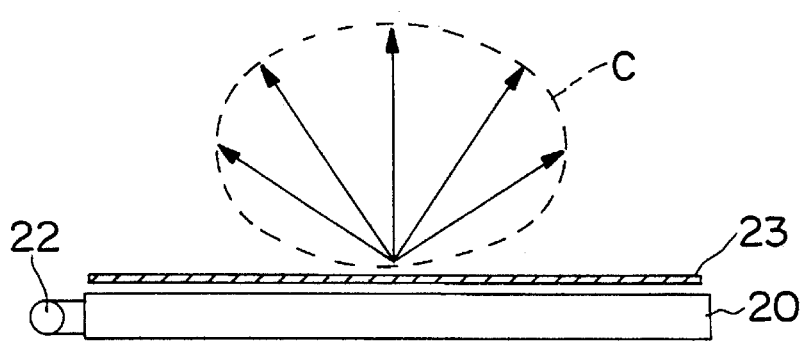
FIG. 3 is an explanatory view showing the light distribution characteristics of the conventional planar lighting device of the edge-light type.
Figure 4:
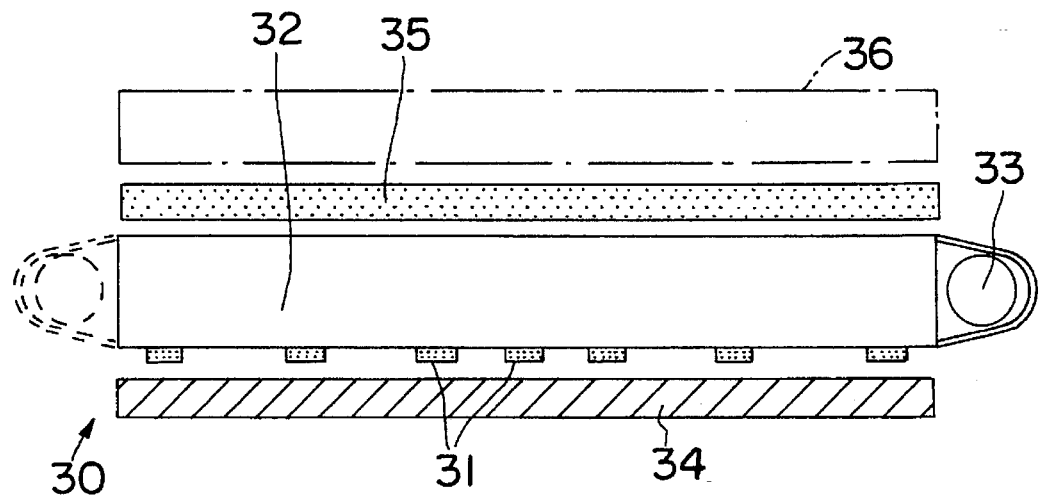
FIG. 4 is a cross-sectional view showing the conventional liquid crystal display device of the edge-light type.

Next, operation of the light adjusting sheet 50 used in a planar lighting device of the edge-light type shown in FIGS. 17 and 18 are described below. When the light source 33 is turned on, the light emitted from the light source 33 enters the light guiding plate 32 directly or after being reflected by the reflector cover 38. The light which has entered the light guiding plate 32 emanates, directly or after being reflected by the reflector plate 34, from the front surface as a strongly directional light (the angle from the light guiding plate 32 is approximately 20°), as shown in FIG. 2. The light emanating from the front surface of the light guiding plate 32 enters the light adjusting sheet 50. Here, since the back surface of the light adjusting sheet 50 through which the light enters has the fine unevenness, the light is diffused. Next, the light which has entered the light adjusting sheet 50 travels through the light adjusting sheet 50 and goes out of its front surface. When the light goes out of the front surface, the direction of the light is altered to the forward direction by the convex ridges and the concave ridges on the front surface.

The light distribution characteristics of the light which has travelled through the light adjusting sheet 50 is analyzed and the result is a very good distribution, indicated by H in FIG. 19. Further, the irregular reflection layer provided on the back surface of the light guiding plate 32 is invisible when looking into the sheet 50. Additionally, when a liquid crystal display element is placed in front of the planar lighting device using the light adjusting sheet, there is no poor readability caused by the irregular reflection layer and the screen is very good-looking.

(Embodiment 6)

Next, Embodiment 6, as shown in FIG. 20 is described below. A light adjusting sheet 70 shown in FIG. 20 has a front surface 71 provided with convex ridges and concave ridges forming a sine curved surface and a back surface 72 provided with unevenness of mat surface forming a sine curved surface by the sand blasting method. The pitch of the ridges of the front surface 71 is 400 μm and the amplitude is 200 μm. The unevenness on the back surface 72 has the same pitch of 400 μm as that of the front surface 71, but the amplitude is 20 μm. The thickness of the light adjusting sheet 70 is 500 μm. The light adjusting sheet 70 is fabricated by extruding a methylmethacrylic resin into a sheet using an extruder and then forming the uneven pattern on the sheet using an embossing roll.

The light adjusting sheet 70 shown in FIG. 20 is installed on the same planar lighting device as the one in Embodiment 5, and the light distribution characteristics are analyzed. The light distribution characteristics are somewhat different from the light distribution characteristics indicated by H in FIG. 19, but the distribution is very good. When a liquid crystal display element is placed in front of this planar lighting device, the front surface of the liquid crystal display element is prevented from being in tight contact with the front surface 71 of the light adjusting sheet 70. Therefore, there is no interference fringe of Newton ring caused by the tight contact. Further, the light is converged in the forward direction by the unevenness on the back surface 72 to produce an even better looking screen than the planar lighting device in Embodiment 5.

(Embodiment 7)

Next, Embodiment 7 shown in FIG. 21 is described below. In Embodiment 7 shown in FIG. 21, unevenness with a triangular cross section is provided on the back surface 82 opposite to the front surface 81 provided with convex ridges and concave ridges forming a sine curved surface in the light adjusting sheet 80. The unevenness of the back surface 82 has the same pitch of 350 μm as the pitch on the front surface 81, but the amplitude is 50 μm. Other than this, the structure is the same as that of Embodiment 5.

The light adjusting sheet 80 of Embodiment 7 shown in FIG. 21 is installed on the planar lighting device used in Embodiment 5, and a liquid crystal display element is placed in front of this planar lighting device. Since the front surface of the light guiding plate 32 is prevented from being in tight contact with the back surface of the unevenness with a triangular cross section of the light adjusting sheet 80. Therefore, there is no interference fringe of Newton ring caused by the tight contact, and the light is better directed in the forward direction by the unevenness on the back surface 82, the result is an even better looking screen than the planar lighting device of Embodiment 5.

(Embodiment 8)

Figure 22:
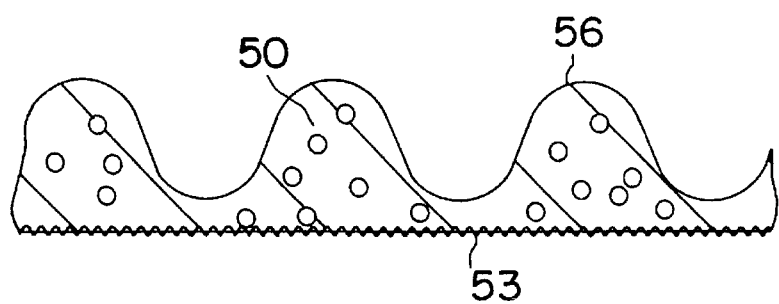
FIG. 22 is a cross-sectional view showing a light adjusting sheet according to the invention.

Next, Embodiment 8 shown in FIG. 22 is described below. Embodiment 8 shown in FIG. 22 is different from Embodiment 5 in that the light adjusting sheet 50 includes 3 weight units of titanium oxide powder mixed in 100 weight units of polycarbonate by which the sheet mainly consists of. Other than this, the structure is the same as that of Embodiment 5.

The light adjusting sheet 50 of Embodiment 8 shown in FIG. 22 is installed on the planar lighting device used in Embodiment 5, and a liquid crystal display element is placed in front of this planar lighting device. Since the light is diffused by the titanium oxide powder, the irregular reflection layer provided on the back surface of the light guiding plate 32 is invisible, and the screen is better looking than the planar lighting device of Embodiment 5.

(Embodiment 9)

Figure 23:
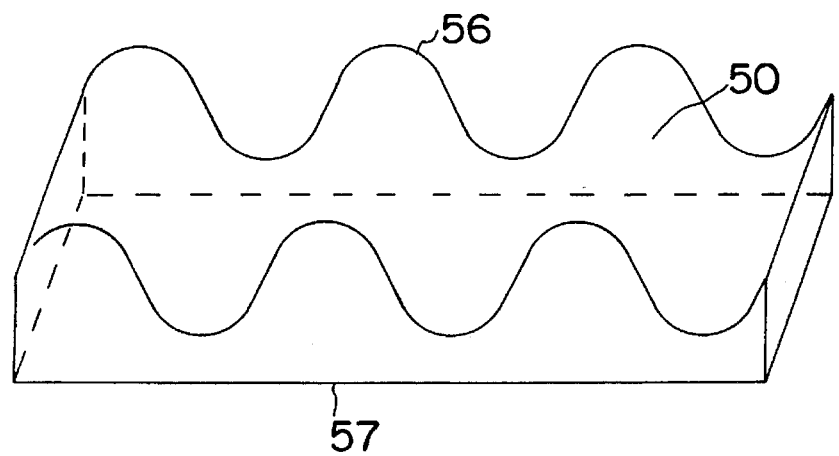
FIG. 23 is a persepective view showing a light adjusting sheet according to the invention.

Next, Embodiment 9 shown in FIG. 23 is described below. The light adjusting sheet 50 of Embodiment 9 shown in FIG. 23 is different from Embodiment 5 in that the back surface 57 opposite to the front surface 56 provided with convex streaks and concave streaks forming a sine curved surface is a flat surface. Other than this, the structure is the same as that of Embodiment 5.

Figure 1:
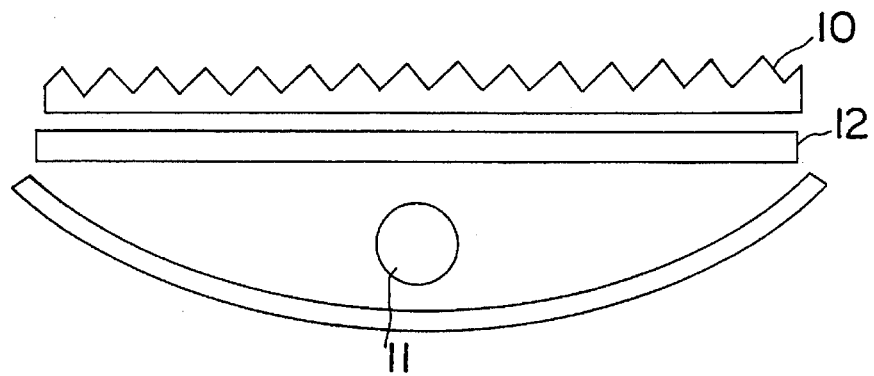
FIG. 1 is an explanatory view showing the conventional planar lighting device.

The light adjusting sheet 50 of Embodiment 9 shown in FIG. 23 is installed on the planar lighting device shown in FIG. 1, and a liquid crystal display element is placed in front of this planar lighting device. Thus a good-looking, brighter than conventional, screen is obtained.

Next, the following testing is carried out in order to compare the performance of conventional light adjusting sheets and those of this invention.

(Comparative testing)

The light adjusting sheet of Embodiment 5 shown in FIG. 17 and that of Embodiment 6 shown in FIG. 20 are used as samples. For control samples, random unevenness of a 150 μm depth is provided on a sheet formed by extruding polycarbonate using an extruder, and fine unevenness is provided, by the sand blasting method, on the back surface (Control sample 4). The thickness of this light adjusting sheet is 200 μm.

The three samples described above are installed on the planar lighting device shown in FIG. 18, and the forward luminance (cd/m$^2$), the angle range (deg) in which the luminance brighter than a half of the forward luminance, and the light emanation appearance quality are measured. The results are shown in Table 2.

TABLE 2

|  | Embodiment 5 | Embodiment 6 | Control sample 4 |
| --- | --- | --- | --- |
| Forward luminance (cd/m$^2$) | 420 | 440 | 350 |
| Angle range (degree) | 45 | 40 | 55 |
| Light emanating appearance quality | ○ | ○ | ○ |

As one can see in Table 2, the sheets of this invention, i.e. Embodiments 5 and 6, have a high forward luminance, a suitably diffused angle range and a good light emanation appearance quality. Therefore, they are excellent sheets. On the other hand, Control Sample 4 has a large angle range and a small forward luminance. Therefore, one can see that it does not emanate the light efficiently in the direction of the user's sight, and that a liquid crystal display element placed in front of it would produce a dim screen.

Next, embodiments of the light adjusting sheet in which a plurality of sheets each having convex ridges and concave ridges approximately parallel to each other on one surface are stacked will be described.

First, two types of sheets (g) (corresponding to the conventional light adjusting sheet) and (h) (corresponding to a light adjusting sheet according to the invention) with different ridges configurations are formed.

Sheet (g)

Figure 24:
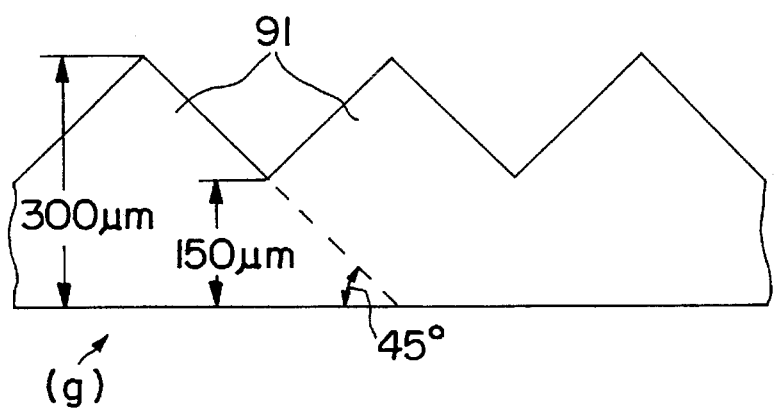
FIG. 24 is a cross-sectional view showing a conventional sheet which can use with a light adjusting sheet according to the invention.

In FIG. 24, a plurality of parallel ridges 91 with a lateral cross section of a right angled isosceles triangle are formed on the light emanating surface of a square sheet (the peak angle is a right angle). The total thickness of the sheet is 300 μm and the height of the ridges 91 is 150 μm. The material of the sheet is polycarbonate with a melt index of 4.0 (290° C., 1.9 kg). The ridges 91 are formed by the hot press method. Such is the configuration of the sheet (g) with a plurality of streaks 91.

Sheet (h)

Figure 25:
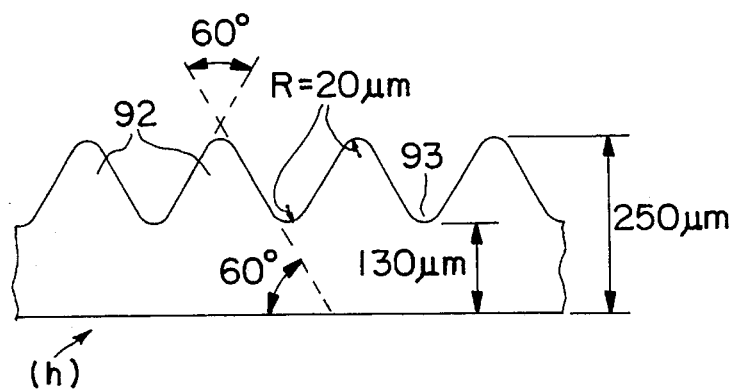
FIG. 25 is a cross-sectional view showing a sheet according to the invention.

In FIG. 25, a plurality of convex ridges 92 and concave ridges 93 parallel to each other are formed on the light emanating surface of a square sheet. Each of the convex ridges 92 has a lateral cross section of a convex arc with a radius of curvature of 20 μm, and each of the concave ridges 93 has a lateral cross section of a concave arc with a radius of curvature of 20 μm. The total thickness of the sheet is 250 μm and the height of the convex ridges 92 is 120 μm. The material of the sheet is polymethyl methacrylate. Such is the configuration of the sheet (h) with a plurality of the convex streaks 92 and concave ridges 93.

The following sets of a cathode ray tube 33, a light guiding plate 32, a reflector plate 34 and a light diffusing sheet 35 are used. Set (A)

Cathode ray tube: One cold cathode ray tube of 3.5 mm diameter and 150 mm length.

Light guiding plate: 150 mm long, 200 mm wide, 3.0 mm thick. The material is polymethyl methacrylate. Dot printing is applied on the bottom surface.

Reflector plate: 100 μm thick. The material is polycarbonate mixed with 20 wt % titanium oxide.

Light diffusing sheet: The material is polycarbonate mixed with 10 wt % calcium carbonate.

Set (B)

Cathode ray tubes: Two hot cathode ray tubes of 5.0 mm diameter and 170 mm length.

Light guiding plate: 170 mm long, 230 mm wide, 5.0 mm thick. The material is polycarbonate. Dot printing is applied on the bottom surface.

Reflector plate: 100 μm thick. The material is polyethylene terephthalate foam.

Light diffusing sheet: The material is polycarbonate mixed with 10 wt % calcium carbonate.

One or a stacked unit of two or more sheets (h) (and the sheet (g) additionaly) described above is used to compose light adjusting sheets, and these sheets are combined with the two types of sets (A) and (B). Each light adjusting sheet is placed in such a way that the peak lines of the convex ridges and the concave ridges are at the required angle to the axis of the cathode ray tube to compose a planar lighting device.

Figure 26:
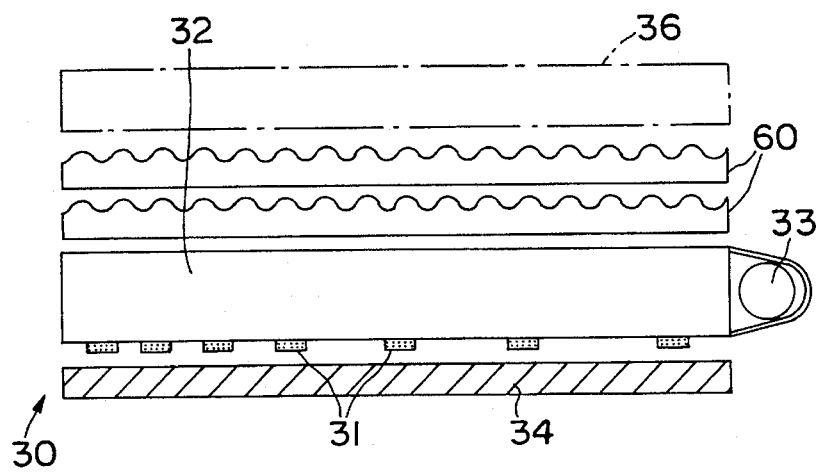
FIG. 26 is a plan view showing a liquid crystal display device of the edge-light type according to the invention.
Figure 27:
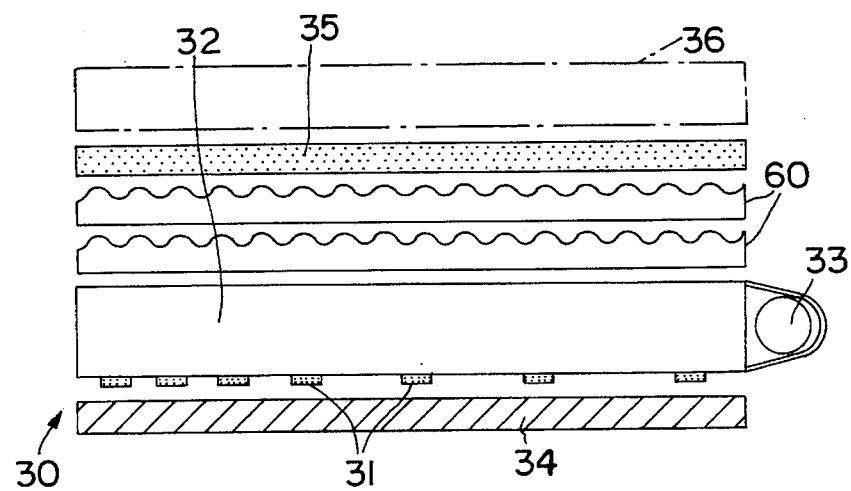
FIG. 27 is a plan view showing a liquid crystal display device of the edge-light type according to the invention.

For example, two sheets 60 are placed on the light guiding plate 32 as shown in FIG. 26, or placed between the light guiding plate 32 and the light diffusing sheet 35 as shown in FIG. 27.

Control examples

Planer lighting devices in which one or two sheets (g) described above is placed in such a way that the peak lines of the convex ridges and the concave ridges are parallel to the axis of the cathode ray tube are also constructed.

For each planar lighting device of Embodiments and the control examples, the forward luminance and the luminance ratio are measured and the appearance is observed. The results are shown in Table 3. In Table 3:

Angle of the ridges: The angle of the ridges is defined to be 0° when the peak lines of the ridges of the light adjusting sheets are parallel to the axis of the cathode ray tube.

Luminance ratio (1): The ratio of the luminance to the highest luminance of the luminance measurements in various observation directions for one luminescent device.

Luminance ratio (2): The ratio of the luminance to the forward luminance of the planar lighting device when the peak lines of the ridges of one or multiple light adjusting sheets are placed parallel to the axis of the cathode ray tube (with other conditions unchanged).

The luminance measurements are conducted with the procedure described earlier.

TABLE 3

|  | Examples | | | | | Control examples | | |
| --- | --- | --- | --- | --- | --- | --- | --- | --- |
|  | 10 | 11 | 12 | 13 | 14 | 5 | 6 | 7 |
| Set of cathode ray tube, etc. (A or B) | A | B | B | A | B | A | A | B |
| Sheet (number of sheets) | h + h (2) | g + h (2) | h + h + h (3) | g + g (2) | g + g (2) | g (1) | g + g (2) | g + g (2) |
| *Peak angle of convex and concave ridges (°) | 15 | +45 −45 | +30 <20 −50 | +45 −45 | +5 −85 | 0 | 0, 0 | +90 −90 |
| Position of light diffusing sheet | Between light guiding plate and light adjusting sheet | Between light guiding plate and light adjusting sheet | Light emanating end | Light emanating end | Between light guiding plate and light adjusting sheet | Between light guiding plate and light adjusting sheet | Between light guiding plate and light adjusting sheet | Between light guiding plate and light adjusting sheet |
| Forward liminance (cd/m$^2$) | 550 | 730 | 725 | 590 | 820 | 370 (Insufficient luminance) | 410 | 530 |
| *Luminance ratio ① | 99% | 98% | 95% | 90% | 99% | 65% | 72% | 99% |
| *Luminance ratio ② | 135% | 140% | 125% | 145% | 155% | — | — | — |
| Appearance | o | o | o | o | o | o | x Interference pattern (Moire) | x Interference pattern (Moire) |

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A light adjusting sheet for a planar lighting device which is placed at the front of a light emitting surface of a light guiding plate which composes said planar lighting device comprising:

on one surface a plurality of convex regions each having a lateral cross section of a convex arc; and also on said one surface a plurality of concave regions each having a lateral cross section of a concave arc;

wherein each convex region and each concave region are arranged alternately and approximately parallel to each other;

said plurality of convex regions and concave regions having a cross-section of a sine curve represented by an equation $$Y = a \cdot \sin bX \quad (1)$$

wherein Y=coordinate in the depth-wise direction in μm units; X=coordinate in the lateral direction in μm units; "a"=factor in the range of 15 to 1500 in μm units; "b"=factor in the range of 0.005 to 1 in degree/μm units; and adjacent concave and convex regions being connected by a flat surface having an area equal to or less than 50% of the total area of the curved surfaces; and an average sheet thickness is in the range of 0.01 to 3 mm.

2. A light adjusting sheet for a planar light device according to claim 1, wherein opposite to said one surface is another surface which is non-optically flat.

3. A light adjusting sheet for a planar lighting device according to claim 2:

wherein said non-optically flat surface is a fine uneven surface.

4. A light adjusting sheet for a planar lighting device according to claim 3:

wherein said fine uneven surface is formed by either the mat treatment method, the sand-blasting method or the press method.

5. A light adjusting sheet for a planar lighting device according to claim 2:

wherein said non-optically flat surface has a triangular cross-section.

6. A light adjusting sheet for a planar lighting device according to claim 2:

wherein another surface opposite to said one surface is made into a non-optically flat surface which is a moderate wave-form surface.

7. A light adjusting sheet for a planar lighting device which is placed at the front of a light emitting surface of a light guiding plate which composes said planar lighting device comprising:

a plurality of convex regions each having a lateral cross section of a convex arc on one surface; and a plurality of concave regions each having a lateral cross section of a concave arc on said one surface;

wherein each convex region and each concave region are arranged alternately and approximately parallel to each other;

said plurality of convex regions and concave regions having a cross-section of a sine curve represented by an equation $$Y = a \cdot \sin bX \quad (1)$$

wherein Y=coordinate in the depth-wise direction in μm units; X=coordinate in the lateral direction in μm units; "a"=factor in the range of 15 to 1500 in μm units; "b"=factor in the range of 0.005 to 1 in degree/μm units; and an average sheet thickness is in the range of 0.01 to 3 mm.

8. A light adjusting sheet for a planar lighting device which is placed at the front of a light emitting surface of a light guiding plate which composes said planar lighting device comprising:

a plurality of convex regions each having a lateral cross-section of a convex arc on one surface; and a plurality of concave regions each having a lateral cross-section of a concave arc on said one surface;

wherein each convex region and each concave region are arranged alternately and approximately parallel to each other;

said plurality of convex regions and concave regions having a cross-section of a sine curve represented by an equation $$Y = a \cdot \sin bX \qquad (1)$$

wherein Y=coordinate in the depth-wise direction in μm units; X=coordinate in the lateral direction in μm units; "a"=factor in the range of 15 to 1500 in μm units; "b"=factor in the range of 0.005 to 1 in degree/μm units;

another surface opposite to said one surface is made into a non-optically flat surface; and an average sheet thickness is in the range of 0.01 to 3 mm.

9. A light adjusting sheet for a planar lighting device according to claim 8:

wherein said non optically-flat surface is a fine uneven surface.

10. A light adjusting sheet for a planar lighting device according to claim 9:

wherein said fine uneven surface is formed by either the mat treatment method, the sand blasting method or the press method.

11. A light adjusting sheet for a planar lighting device according to claim 8:

wherein said non optically-flat surface has a triangular cross section.

12. A light adjusting sheet for a planar lighting device according to claim 8:

wherein said non optically-flat surface is a moderate wave-form surface.

13. A light adjusting sheet for a planar lighting device according to claim 8:

wherein said light adjusting sheet contains a light diffusing material.

14. A planar lighting device comprising:

a light guiding plate having a dot pattern on a back surface;

a linear light source placed on at least one side of said light guiding plate;

a reflector plate placed in back of said light guiding plate; and a light adjusting sheet placed at the front of a light emitting surface of said light guiding plate, having on one surface a plurality of convex regions each having a lateral cross section of a convex arc and also on said one surface a plurality of concave regions each having a lateral cross section of a concave arc;

wherein each convex region and each concave region are arranged alternately and approximately parallel to each other;

adjacent concave and convex regions being connected by a flat surface having an area equal to or less than 50% of the total area of the curved surfaces;

another surface opposite to said one surface having a non-optical flat surface; and peak lines of said convex regions and bottom lines of said concave regions of said light adjusting sheet being arranged to make a predetermined angle with an axis of said linear light source.

15. A planar lighting device comprising:

a light guiding plate having a dot pattern on a back surface;

a linear light source placed on at least one side of said light guiding plate;

a reflector plate placed in back of said light guiding plate; and a light adjusting sheet placed at the front of a light emitting surface of said light guiding plate, having on one surface a plurality of convex regions each having a lateral cross section of a convex arc and also on said one surface a plurality of concave regions each having a lateral cross section of a concave arc;

wherein each convex region and each concave region are arranged alternately and approximately parallel to each other;

said plurality of convex regions and concave regions having a cross-section of a sine curve represented by an equation $$Y = a \cdot \sin bX \qquad (1)$$

wherein Y=coordinate in the depth-wise direction in μm units; X=coordinate in the lateral direction in μm units; "a"=factor in μm units; "b"=factor in degree/μm units;

another surface opposite to said one surface having a non-optical flat surface; and peak lines of said convex regions and bottom lines of said concave regions of said light adjusting sheet being arranged to made a predetermined angle with an axis of said linear light source.

16. A liquid crystal display comprising:

a light guiding plate having a dot pattern on a back surface;

a liquid crystal display element being forward of said light guiding plate;

a linear light source placed on at least one side of said light guiding plate;

a reflector plate placed in back of said light guiding plate; and a light adjusting sheet placed at the front of a light emitting surface of said light guiding plate, having on one surface a plurality of convex regions each having a lateral cross section of a convex arc and also on said one surface a plurality of concave regions each having a lateral cross section of a concave arc;

wherein each convex region and each concave region are arranged alternately and approximately parallel to each other;

adjacent concave and convex regions being connected by a flat surface having an area equal to or less than 50% of the total area of the curved surfaces;

another surface opposite to said one surface having a non-optical flat surface; and peak lines of said convex regions and bottom lines of said concave regions of said light adjusting sheet being arranged to make a predetermined angle with an axis of said linear light source.

17. A liquid crystal display comprising:

a light guiding plate having a dot pattern on a back surface;

a liquid crystal display element being forward of said light guiding plate;

a linear light source placed on at least one side of said light guiding plate;

a reflector plate placed in back of said light guiding plate; and a light adjusting sheet placed at the front of a light emitting surface of said light guiding plate, having on one surface a plurality of convex regions each having a lateral cross section of a convex arc and also on said one surface a plurality of concave regions each having a lateral cross section of a concave arc;

wherein each convex region and each concave region are arranged alternately and approximately parallel to each other;

said plurality of convex regions and concave regions having a cross-section of a sine curve represented by an equation $$Y = a \cdot \sin bX \qquad (1)$$

wherein Y=coordinate in the depth-wise direction in μm units; X=coordinate in the lateral direction in μm units; "a"=factor in μm units; "b"=factor in degree/μm units;

another surface opposite to said one surface having a non-optical flat surface; and peak lines of said convex regions and bottom lines of said concave regions of said light adjusting sheet being arranged to made a predetermined angle with an axis of said linear light source.

* * * * *